United States Patent
Tsai et al.

(10) Patent No.: US 10,600,547 B2
(45) Date of Patent: Mar. 24, 2020

(54) INDUCTION TYPE POWER SUPPLY SYSTEM AND COIL MODULE THEREOF

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 150 days.

(21) Appl. No.: 15/911,177

(22) Filed: Mar. 5, 2018

(65) Prior Publication Data
US 2018/0190420 A1    Jul. 5, 2018

(30) Foreign Application Priority Data

Jan. 4, 2018   (TW) .............................. 107100297 A

(51) Int. Cl.
| | |
|---|---|
| *H01F 27/02* | (2006.01) |
| *H02J 50/10* | (2016.01) |
| *H01F 27/28* | (2006.01) |
| *H01F 38/14* | (2006.01) |
| *H02J 7/02* | (2016.01) |
| *B60L 53/12* | (2019.01) |

(52) U.S. Cl.
CPC .............. *H01F 27/02* (2013.01); *B60L 53/12* (2019.02); *H01F 27/28* (2013.01); *H01F 27/2885* (2013.01); *H01F 38/14* (2013.01); *H02J 7/025* (2013.01); *H02J 50/10* (2016.02)

(58) Field of Classification Search
CPC ...... H01F 27/02; H01F 27/28; H01F 27/2885; H02J 50/10; H02J 50/40; H02J 7/025; B60L 53/12
USPC ......................................................... 307/104
See application file for complete search history.

(56) References Cited

U.S. PATENT DOCUMENTS

2009/0200873 A1   8/2009  Lee

FOREIGN PATENT DOCUMENTS

| TW | 201417445 A | 5/2014 |
|---|---|---|
| TW | 201714382 A | 4/2017 |

*Primary Examiner* — Hal Kaplan
(74) *Attorney, Agent, or Firm* — Winston Hsu

(57) ABSTRACT

A coil module for an induction type power supply system includes a metal frame, a coil, a circuit board and an upper lid. The coil is disposed on a first surface of the metal frame. The circuit board, disposed on a second surface of the metal frame, includes a control circuit for controlling operations of the coil. The upper lid, for covering the coil, is composed of a non-metal material and has an arc structure.

15 Claims, 7 Drawing Sheets

INDUCTION TYPE POWER SUPPLY SYSTEM AND COIL MODULE THEREOF

BACKGROUND OF THE INVENTION

1. Field of the Invention

The present invention relates to an induction type power supply system and a coil module thereof, and more particularly, to an induction type power supply system and a coil module applicable to an automatic guided vehicle (AGV).

2. Description of the Prior Art

In recent years, factories are toward the trends of automation and unmanned. Such automation factories require a large number of transport vehicles, i.e., automatic guided vehicles (AGVs) without a driver. Conventionally, the AGVs are operated during office hours. After getting off work, an operator connects the AGVs to power wires and sockets to charge the AGVs with the electric power for operations in the next day. In such a condition, the AGVs are only operated in the day time, but cannot support full-time operations in 24 hours. Also, the AGVs should be equipped with a battery having large capacity, to support the operations during the entire office hours.

In order to enhance the performance of AGVs, the industry starts to introduce automatic charging. In general, an AGV may stay in several idle places during its routing cycle. A charging station is disposed in each idle place, allowing the AGV to replenish electric power during the operating process; hence, the AGV may perform long-time operations without large battery capacity. Conventionally, the AGV is charged via an electric brush in the charging station. However, the electric brush has to contact a metal node of the AGV during the charging period, where the electric brush wears more rapidly and may generate dust and spark more easily, and therefore cannot be utilized in a clean room or similar environment. It is also dangerous if the electric brush is utilized in a petrochemical factory having flammable gas or combustible materials.

Therefore, a preferable charging method is wireless charging using electromagnetic induction. The wireless charging method is performed with electromagnetic induction between two coils, where the induction efficiency is highly related to the coil distance. If the distance is closer, the efficiency becomes better; if the distance is farther, the efficiency becomes worse. However, most modern AGVs are implemented without rails. In an example, a rail-less system may be realized by pasting colored adhesive tapes, where the AGV may move along the adhesive tapes. The rail-less system does not require disposition of rails, so that the disposition cost of the rail-less system is much less than a rail system, and the rail-less system has higher flexibility; hence, the rail-less system has become the mainstream of the AGV system. However, an AGV in the rail-less system may only move along its path roughly but may not be positioned accurately. Thus, it is difficult to effectively control the AGV to move to a fixed place in the charging station. For example, the movement of the AGV may possess a deviation of approximately 3 centimeters (cm), and the 3-cm distance is enough to significantly reduce the charging efficiency of the induction type power supply system.

In such a condition, the locations of the charging station and the AGV may be designed to make the two coils as close as possible when the AGV stops at the charging station, in order to enhance the charging efficiency. However, if the AGV deviates, this design method may easily cause that the AGV collides with the charging device on the charging station. Since the AGV is used for carrying a large number of materials or goods, the AGV may usually have powerful carrying capacity and may be solid, which may cause that the charging device is damaged due to the collision. Thus, there is a need for improvement over the prior art.

SUMMARY OF THE INVENTION

It is therefore an objective of the present invention to provide an induction type power supply system and a related coil module applicable to the automatic guided vehicles (AGVs), in order to solve the above problems.

An embodiment of the present invention discloses a coil module for an induction type power supply system. The coil module comprises a metal frame, a coil, a circuit board and an upper lid. The coil is disposed on a first surface of the metal frame. The circuit board, disposed on a second surface of the metal frame, comprises a control circuit for controlling operations of the coil. The upper lid, for covering the coil, is composed of a non-metal material and has an arc structure.

Another embodiment of the present invention discloses an induction type power supply system, which comprises a plurality of fixing frames and a plurality of coil modules. Each of the plurality of coil modules is disposed on one of the plurality of fixing frames and comprises a metal frame, a coil, a circuit board and an upper lid. The coil is disposed on a first surface of the metal frame. The circuit board, disposed on a second surface of the metal frame, comprises a control circuit for controlling operations of the coil. The upper lid, for covering the coil, is composed of a non-metal material and has an arc structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
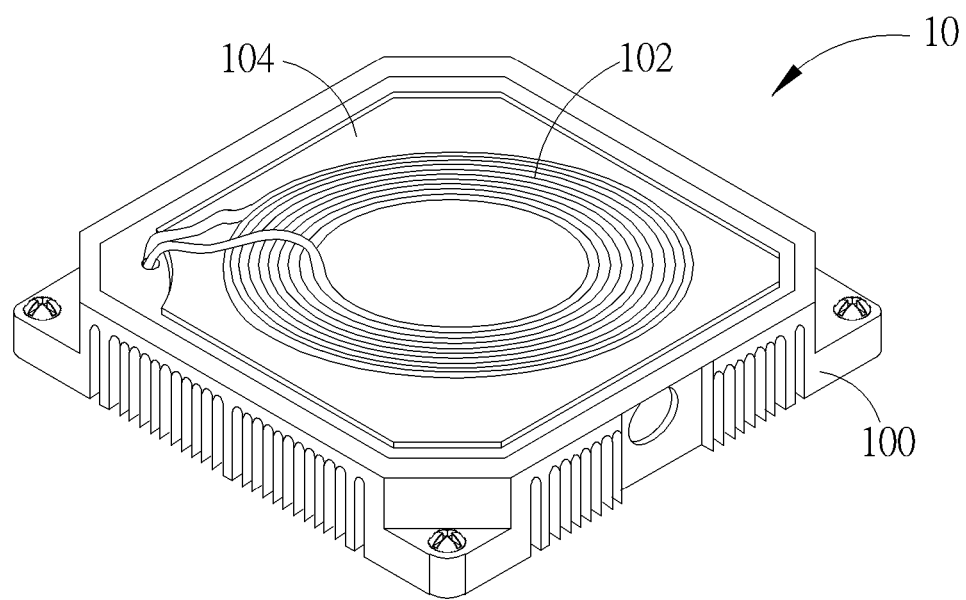
FIG. 1A and FIG. 1B are schematic diagrams of a coil module according to an embodiment of the present invention.
Figure 1B:
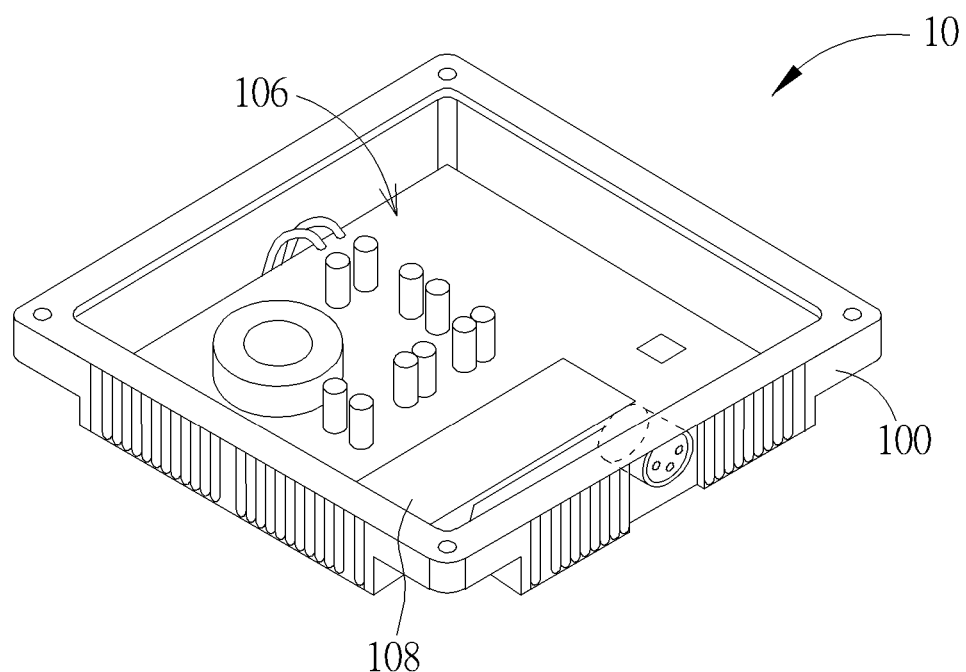

Please refer to FIG. 1A and FIG. 1B, which are schematic diagrams of a coil module 10 according to an embodiment of the present invention. FIG. 1A illustrates the front surface of the coil module 10, and FIG. 1B illustrates the back surface of the coil module 10. As shown in FIG. 1A, the coil module 10 includes a metal frame 100, a coil 102 and a magnetic conductor 104. The metal frame 100, as the main structure of the coil module 10, is used for carrying the devices such as the coil 102 and the circuit board in the coil module 10. The metal frame 100 is capable of heat dissipation, waterproof, etc. Also, the metal frame 100 should be solid and composed of a collision resistant material, which should be able to endure the collision force from the AGV. In an embodiment, the metal frame 100 may be an aluminum frame composed of aluminum, and is not limited herein. The coil 102 is disposed on the front surface of the metal frame 100, for performing electromagnetic induction. When the coil module 10 is disposed in a charging station, the coil 102 may be served as a supplying-end coil for sending electric power. When the coil module 10 is disposed in an AGV or other power receiving device having power reception capability, the coil 102 may be served as a receiving-end coil for receiving electric power. The magnetic conductor 104, disposed between the coil 102 and the metal frame 100, is used for isolating electromagnetic energies of the coil 102, to prevent the energies of the coil 102 from being transmitted to the metal to generate heat. In addition, the magnetic conductor 104, which has heat conduction capability, may conduct the heat energies generated in the coil 102 when the current passes through the coil 102, where the heat energies are transmitted to the metal frame 100 for heat dissipation. The magnetic conductor 104 may be composed of a magnetic material with high magnetic permeability. The magnetic material may be a Mn—Zn core, a Ni—Zn core, an iron powder core, a molypermalloy powder (MPP) core, a sendust core, a ferrite core, a high flux core or other equivalent magnetic material. The coil 102 and the magnetic conductor 104 may be disposed and mounted on the metal frame 100 by any method. For example, the magnetic conductor 104 may be pasted on the metal frame 100 with glue, and the coil 102 may be pasted on another surface of the magnetic conductor 104 with glue. In this embodiment, the coil 102 has one wire winded in a single layer, and the magnetic conductor 104 may be designed based on the shapes of the coil 102 and the metal frame 100, such as an approximately square sheet of magnetic conductor. However, the implementations of the coil 102 and the magnetic conductor 104 according to the present invention should not be limited herein. For example, a coil module may be realized by superposing multiple layers of coils and multiple magnetic conductors.

As shown in FIG. 1B, the coil module 10 further includes a circuit board 106 disposed on the back surface of the metal frame 100. The circuit board 106 includes a control circuit for controlling operations of the coil 102. When the coil module 10 is disposed in the charging station, the circuit board 106 includes circuits for the supplying-end coil, such as a resonant capacitor, power driver unit, supplying-end processor and modulation data receiver. When the coil module 10 is disposed in the AGV or other power receiving device capable of receiving electric power, the circuit board 106 includes circuits for the receiving-end coil such as a rectifier, regulator and receiving-end processor. The circuit board 106 may further include a display screen 108 for displaying the operation status of the coil module 10. For example, the display screen 108 may display whether the coil module 10 is supplying electric power or receiving electric power, or display any message indicating abnormal operations. The circuit board 106 may be disposed and mounted on the metal frame 100 by any method. For example, the circuit board 106 may be mounted on the metal frame 100 via screws.

Figure 2:
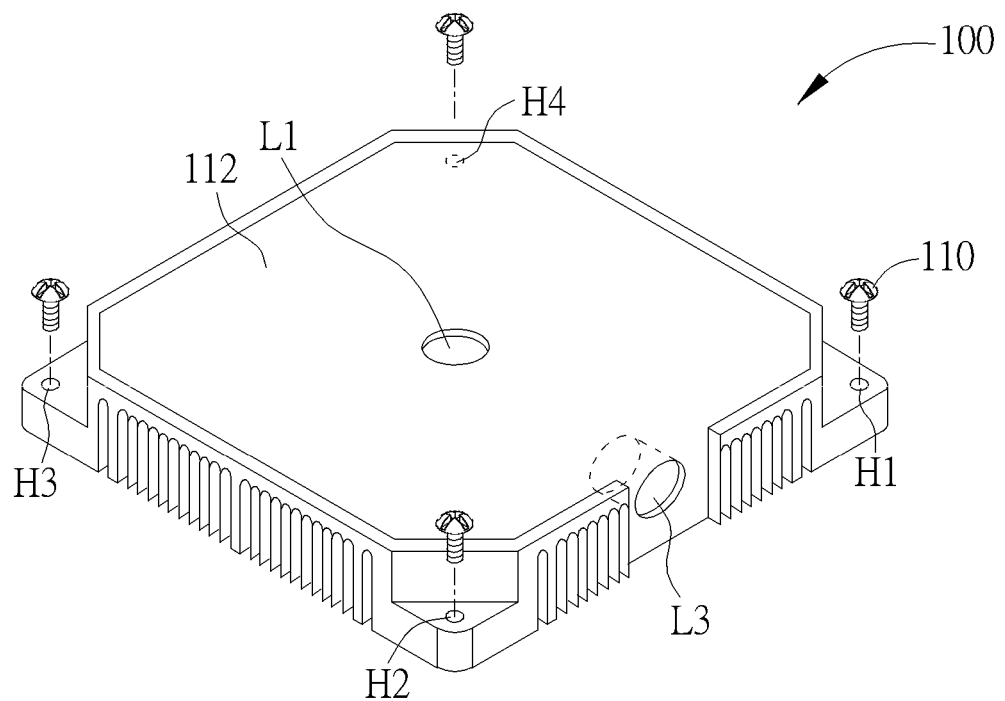
FIG. 2 is a schematic diagram of a detailed structure of the metal frame.

Please refer to FIG. 2, which is a schematic diagram of a detailed structure of the metal frame 100. As shown in FIG. 2, the metal frame 100 is a quadrangle metal frame, of which four corners are disposed with holes such as screw holes H1-H4. The coil module 10 may further include one or more fixing members 110. The fixing members 110 are fitted on the screw holes H1-H4, to connect and mount the metal frame 100 to an external fixing frame. In order to prevent the coil modules 10 on the AGV and the charging station from colliding with each other to cause damages, the fixing member 110 may have a shock absorption structure. When a collision occurs, the shock absorption structure may be applied to adjust the positions to mitigate the collision force. For example, the fixing member 110 may be a spring screw, which is locked on the external fixing frame via the screw holes H1-H4. The spring on the spring screw has flexibility and is capable of absorbing the force generated from the collision. In another embodiment, the fixing member 110 may also include a gas shock absorber or a hydraulic shock absorber, or include other structure with flexibility, to realize the shock absorption effect.

In addition, a division plate 112 in the metal frame 100 is used for disposing the coil 102 and the circuit board 106, wherein the coil 102 is disposed on the front surface of the division plate 112 and the circuit board 106 is disposed on the back surface of the division plate 112. The division plate 112 includes a hole L1, where the wire connected with the coil 102 passes through the hole L1 to reach the circuit board 106, and is further connected with the circuit board 106 by using welding, for example. In addition, a side of the metal frame 100 also includes a hole L3, and the circuit board 106 may be connected to external devices via a connector passing through the hole L3, to be connected with a power supply terminal or a power receiving terminal, depending on whether the coil module 10 is configured to supply electric power or receive electric power. Note that the rim of the metal frame 100 may be designed to have multiple grooves, and this design scheme allows more surface area of the metal frame 100 to be exposed to the air, which aids in heat dissipation of the metal frame 100.

Figure 3A:
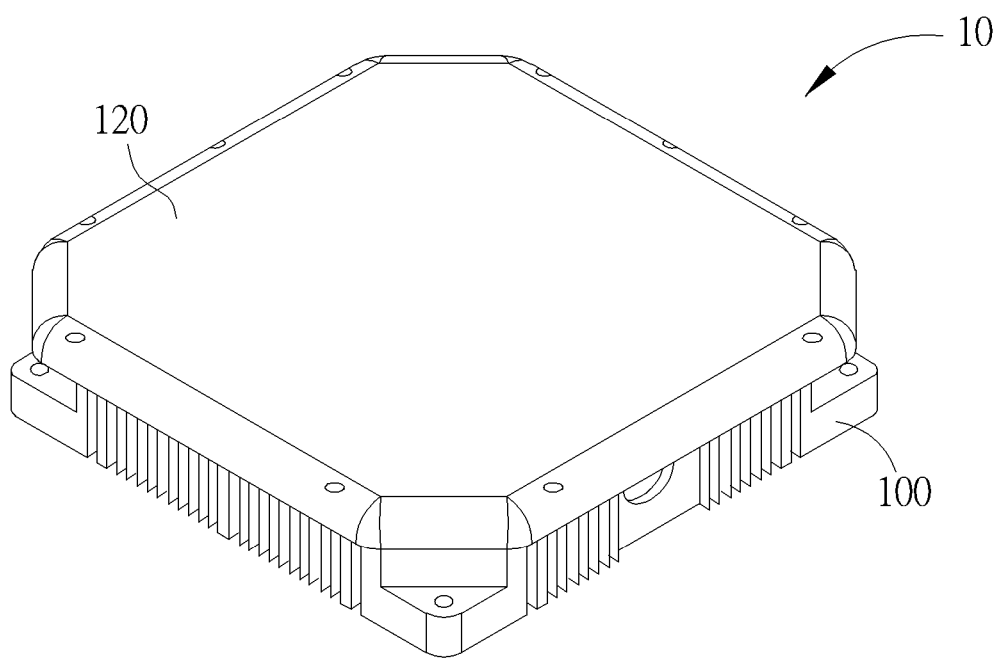
FIGS. 3A-3C are schematic diagrams of the entire coil module.

Moreover, the coil module 10 may further include an upper lid and a lower lid, for covering the elements on the metal frame 100 and providing the waterproof function. Please refer to FIGS. 3A-3C, which are schematic diagrams of the entire coil module 10. The coil module 10 includes an upper lid 120 and a lower lid 130. FIG. 3A illustrates the top view of the coil module 10, FIG. 3B illustrates the bottom view of the coil module 10, and FIG. 3C illustrates the side view of the coil module 10.

As shown in FIG. 3A, when the upper lid 120 is fitted on the metal frame 100, the upper lid 120 may entirely cover the coil 102 and shield the coil 102, in order to prevent water from penetrating into the coil 102. Since the upper lid 120 is disposed on the induction surface of the coil 102, the energies of the coil 102 should pass through the upper lid 120. In such a condition, the upper lid 120 should be manufactured with a non-metal material that may not block the electromagnetic energies. In addition, in order to endure the collision of the AGV, the sides of the upper lid 120 have an arc structure. When a collision occurs, the arc structure is capable of mitigating the collision force, and the shock absorption structure of the fixing member 110 allows the coil module 10 to move outward when the collision occurs, to prevent the coil module 10 from being damaged due to collision. FIG. 3C is the side view diagram of the coil module 10, which clearly shows the arc structure of the upper lid 120.

Figure 3B:
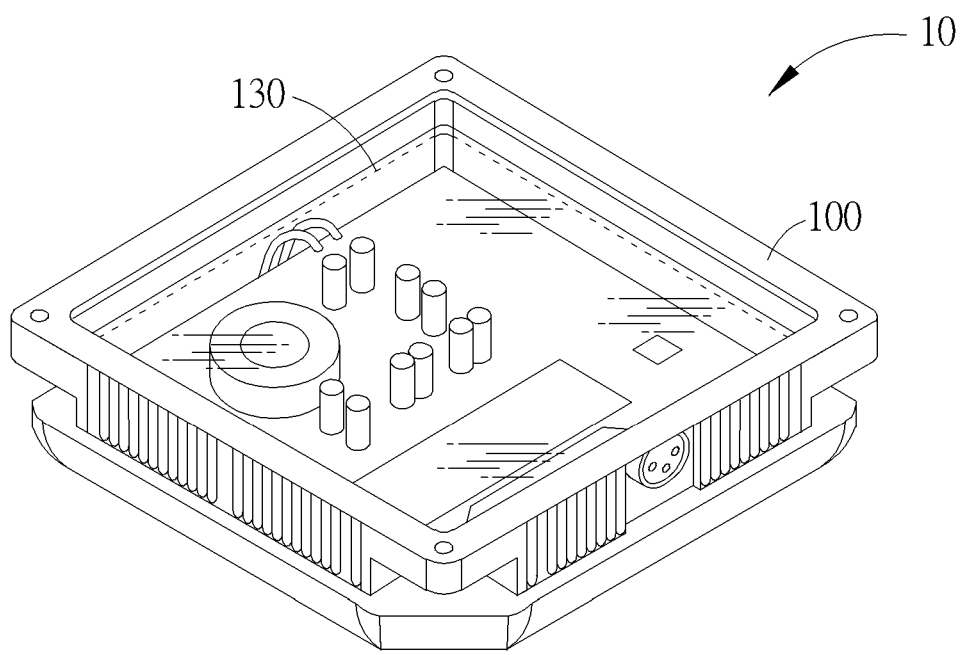
Figure 3C:
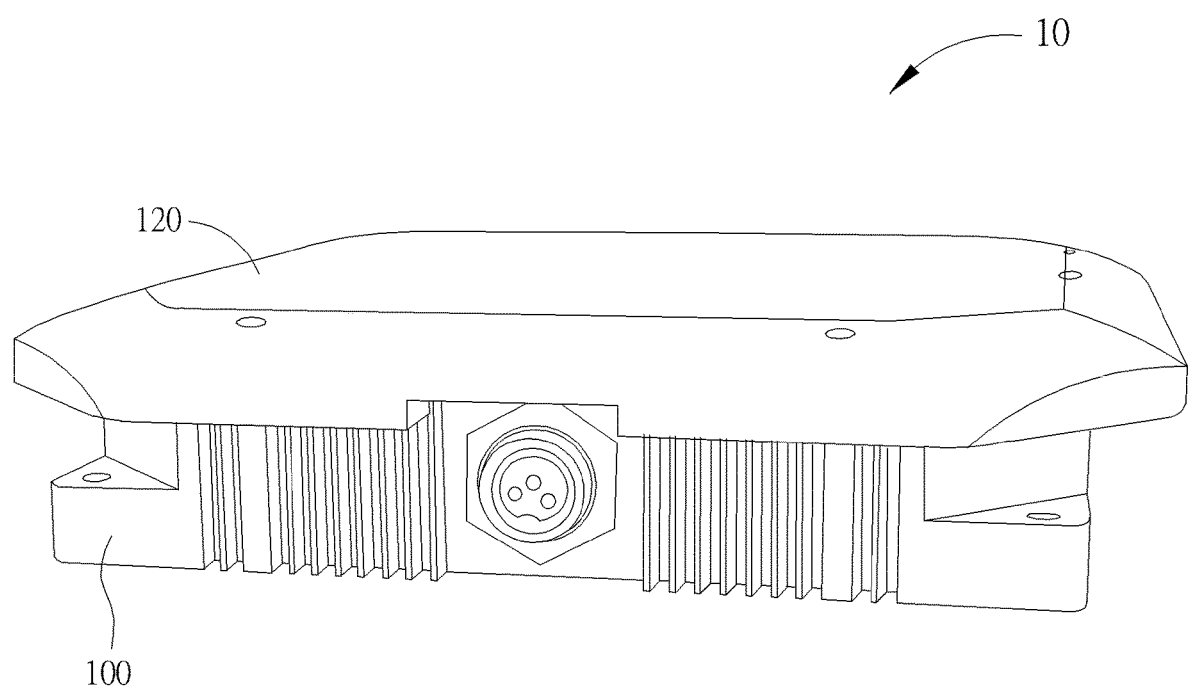

As shown in FIG. 3B, when the lower lid 130 is fitted on the metal frame 100, the lower lid 130 may entirely cover the circuit board 106 and shield the circuit board 106, in order to prevent water from penetrating into the circuit board 106. Since the circuit board 106 should display information related to operations of the coil module 10 such as via the display screen 108, preferably, the lower lid 130 may be manufactured with a transparent material, allowing the user to easily watch the information displayed on the circuit board 106, so as to perform trouble shooting immediately when a problem occurs. In an embodiment, the lower lid 130 may be a transparent acrylic board, and should not be limited herein.

Please note that the coil module 10 of the present invention may be used in a charging station or a power receiving device (e.g., the AGV), for performing charging on the power receiving device. In other words, the power supply terminal and the power receiving terminal may apply the same structure of the coil module 10 with a difference in the circuit board only. This saves the deployment cost of the induction type power supply system. For example, the same metal frame 100 may be used for the supplying-end module and also for the receiving-end module; hence, the manufacturer only needs to open the mold once, which saves the molding cost.

Figure 4:
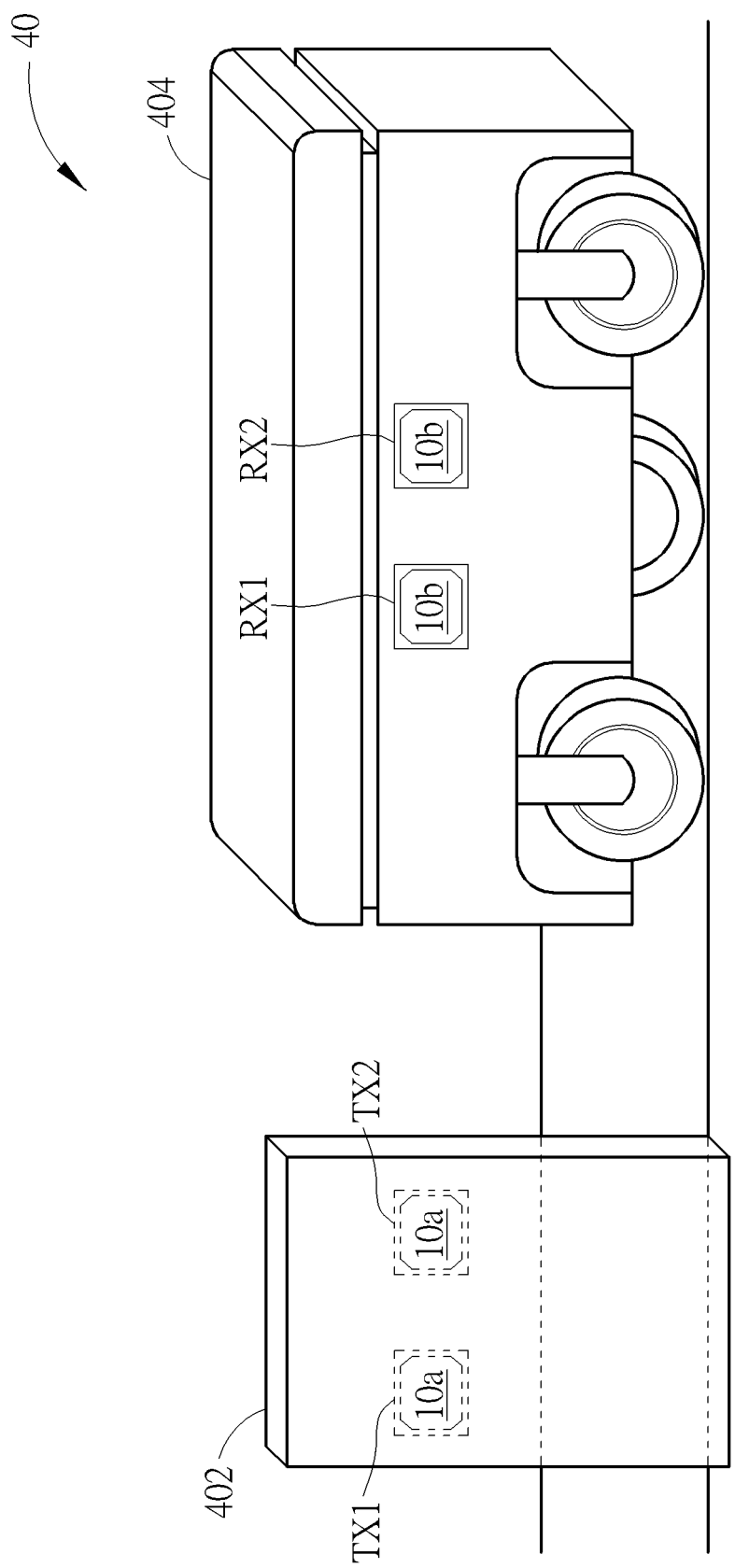
FIG. 4 is a schematic diagram of an induction type power supply system according to an embodiment of the present invention.

Please refer to FIG. 4, which is a schematic diagram of an induction type power supply system 40 according to an embodiment of the present invention. As shown in FIG. 4, the induction type power supply system 40 includes a charging pillar 402 and an AGV 404. The charging pillar 402 is disposed in a charging station as a power supply device, which includes fixing frames TX1 and TX2. Two coil modules 10a are mounted on the fixing frames TX1 and TX2, respectively, and these two coil modules 10a are served as supplying-end coils for supplying electric power. The AGV 404, which is served as a power receiving device for receiving electric power to perform operations, includes fixing frames RX1 and RX2. Two coil modules 10b are mounted on the fixing frames RX1 and RX2, respectively, and these two coil modules 10b are served as receiving-end coils for receiving electric power. The structure of the coil modules 10a and 10b is identical to the structure of the coil module 10 shown in FIGS. 1A-3C, and will not be narrated herein. Note that the coil modules 10a and 10b are respectively mounted on the fixing frames via one or more fixing members 110 having the shock absorption structure. The shock absorption structure of the fixing members 110 is able to absorb the collision force. In addition, the charging pillar 402 and AGV 404 in the induction type power supply system 40 are only one of various implementations of the present invention. Those skilled in the art should realize that the power supply terminal may be any power supply device, such as a wireless charger on a desk, and that the power receiving terminal may be any device that operates based on the received electric power, such as a mobile phone, computer, and electric vehicle.

In this embodiment, the AGV 404 may move along a predefined path and enter the charging station at a side of the charging pillar 402. The AGV 404 may stop at a side of the coil module 10a where the charging pillar 402 is disposed, so that the coil module 10b disposed on the AGV 404 may be aligned with the coil module 10a disposed on the charging pillar 402. At this moment, the coil module 10b may start to receive wireless power from the coil module 10a. In addition, after the AGV 404 departs from the charging station, the charging operations may be automatically interrupted.

As mentioned above, when the movement of the AGV 404 deviates to be closer to the charging pillar 402, a collision may occur between the coil module 10a and the coil module 10b. At this moment, the upper lids 120 of the coil modules 10a and 10b may contact each other. Due to the shock absorption structure of the fixing member 110, when the collision occurs, the coil modules 10a and 10b may move outward, respectively. Also, the AGV 404 may slightly move toward the direction opposite to the charging pillar 402 along with the arc of the upper lid 120, to mitigate or eliminate the collision force. As a result, even if a collision due to deviation of movement occurs, the AGV 404 may finally stop at a location adaptive to charging, and the arc structure of the upper lid 120 and the shock absorption structure of the fixing member 110 aid in mitigating or eliminating the collision force.

Please note that different applications of the induction type power supply system usually require different levels of output power. In such a condition, the power supply terminal and the power receiving terminal may include any number of coil module(s) 10 to realize different power output. Take the induction type power supply system 40 in FIG. 4 as an example. The charging station includes 2 coil modules 10a, and the AGV 404 also includes 2 coil modules 10b. The back-end circuit of the coil module 10 disposed on the AGV 404 may be connected to the power receiving terminal in parallel or in series, to realize multiple output power. In another embodiment, the power supply terminal may include 3 coil modules 10a or more, and the power receiving terminal may correspondingly include the same number of coil modules 10b. The number and disposition of coil modules are not limited herein. In comparison, in the prior art, different output power is usually realized with different coil sizes. When a single coil is applied to output large power, higher manufacture cost and maintenance cost are required. In such a condition, the method of combining multiple coils to enhance output power has the benefit of cost reduction.

Figure 5:
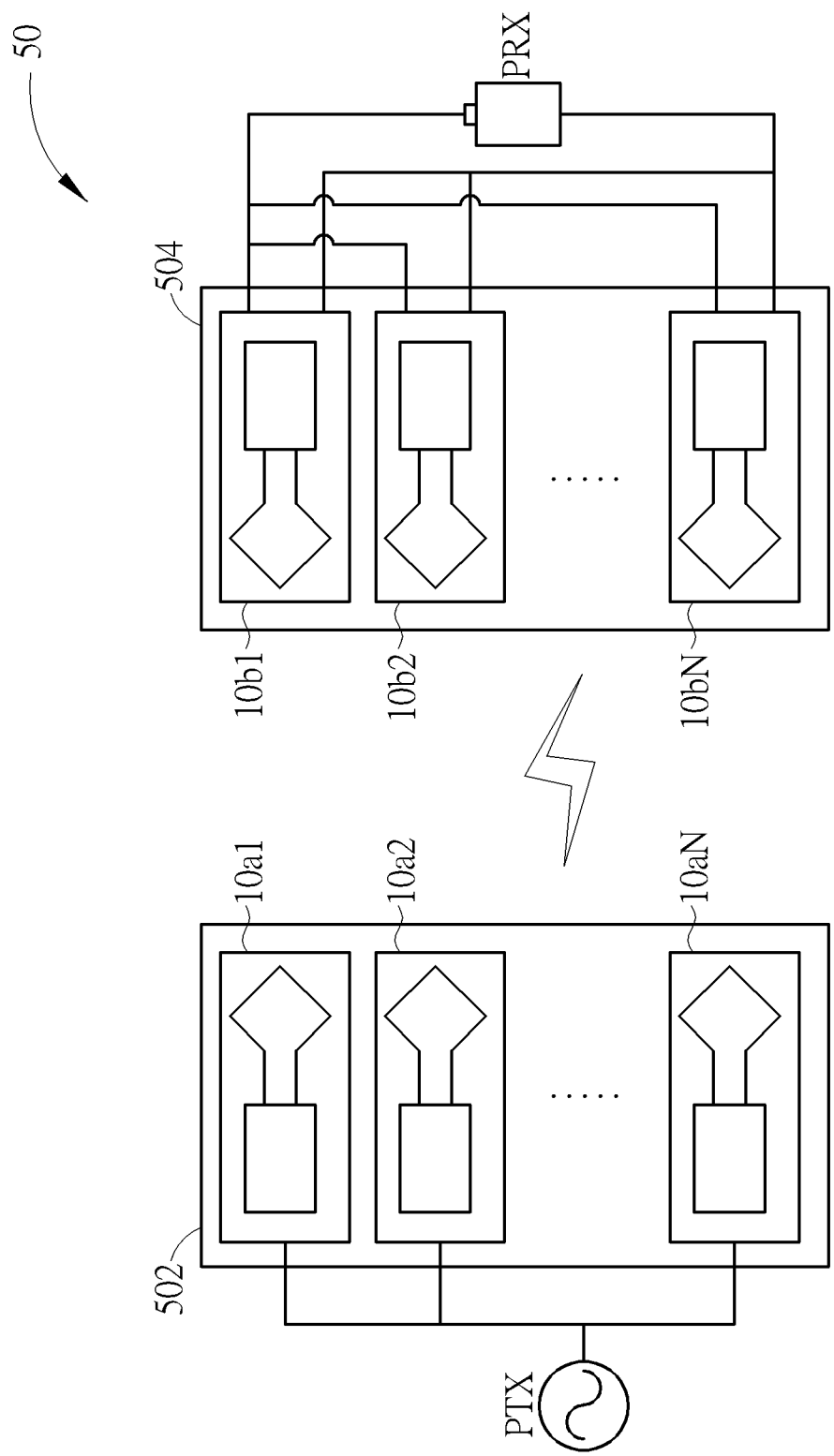
FIG. 5 is a schematic diagram of an induction type power supply system according to an embodiment of the present invention.

Please refer to FIG. 5, which is a schematic diagram of an induction type power supply system 50 according to an embodiment of the present invention. As shown in FIG. 5, the induction type power supply system 50 includes a supplying-end module 502 and a receiving-end module 504. The supplying-end module 502, which may be disposed in a charging station or other power supply device, includes N coil modules 10a1-10aN. The receiving-end module 504, which may be disposed in an AGV or other power receiving device, correspondingly includes N coil modules 10b1-10bN. The coil modules 10a1-10aN in the supplying-end module 502 receive electric power from a power supply terminal PTX, and transmit electric power to the coil modules 10b1-10bN in the receiving-end module 504 via electromagnetic induction. The back-end circuits of the coil modules 10b1-10bN are connected to a power receiving terminal PRX (e.g., a battery) in parallel. In such a condition, the combination of multiple coil modules may increase output power. For example, if each of the coil modules 10b1-10bN is capable of outputting a voltage 10V and a current 10 A, the back-end circuits with 5 coil modules connected in parallel may output a voltage 10V and a current 50 A, which may realize an application with large current requirement.

Figure 6:
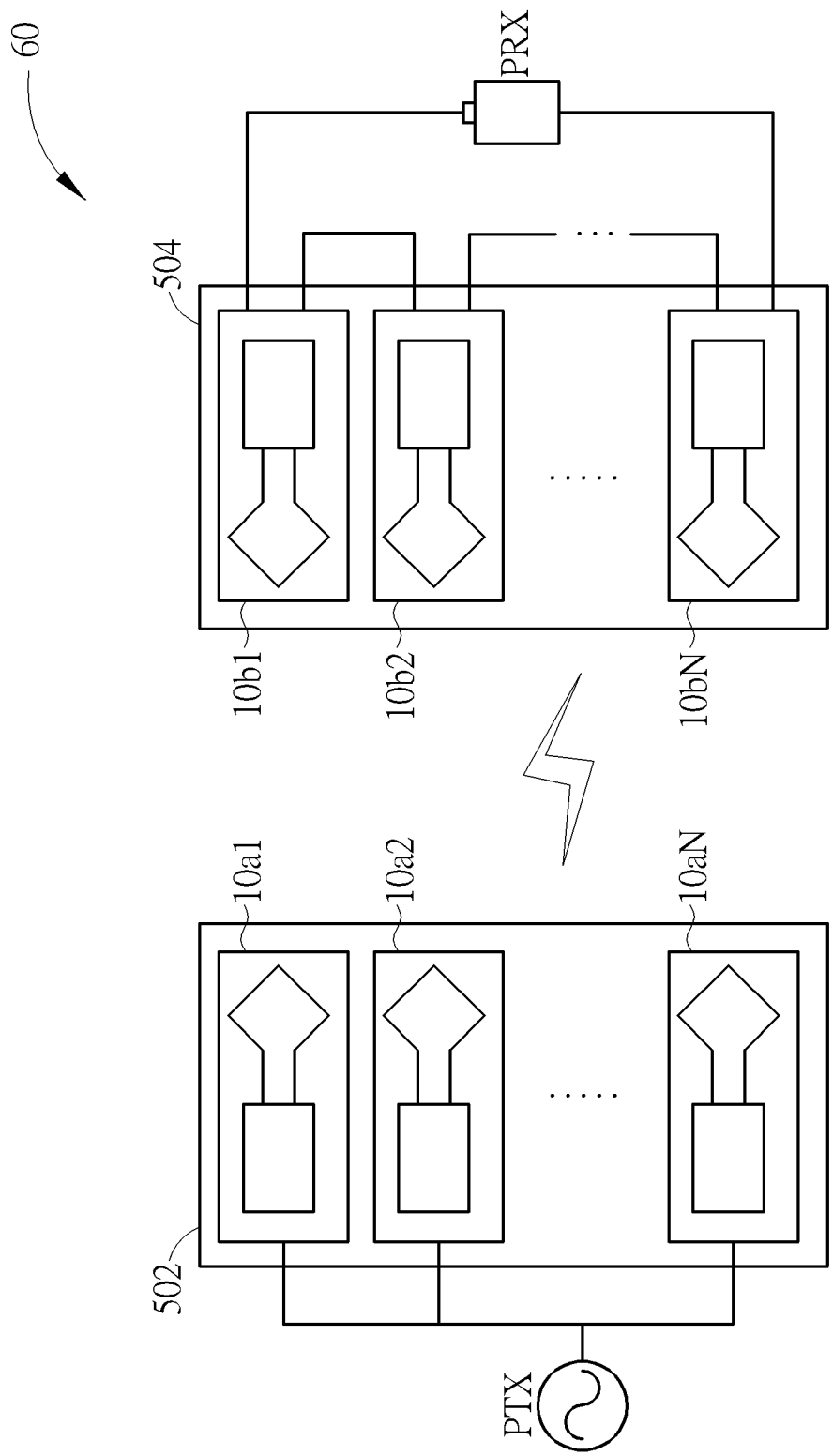
FIG. 6 is a schematic diagram of an induction type power supply system according to an embodiment of the present invention.

Please refer to FIG. 6, which is a schematic diagram of an induction type power supply system 60 according to an embodiment of the present invention. The induction type power supply system 60 has a structure similar to the induction type power supply system 50, so elements having the same functions are denoted by the same symbols. The difference between the induction type power supply system 60 and the induction type power supply system 50 is that, in the induction type power supply system 60, the back-end circuits of the coil modules 10*b*1-10*b*N are connected to a power receiving terminal PRX in series. For example, if each of the coil modules 10*b*1-10*b*N is capable of outputting a voltage 10V and a current 10 A, the back-end circuits with 5 coil modules connected in series may output a voltage 50V and a current 10 A, which may realize an application with high voltage requirement. In addition, the parallel and series connection may be combined in the back-end circuits of the induction type power supply system, in order to realize the applications with high voltage and high current according to circuit requirements.

Please note that the structure of the coil module according to the present invention may realize wireless charging of AGVs. Those skilled in the art may make modifications and alternations accordingly. For example, in the above embodiments, the metal frame 100 of the coil module 10 has a quadrangular structure, where 4 fixing members 110 are disposed at the screw holes H1-H4 in four corners of the metal frame 100, respectively, to mount the coil module 10 on the fixing frame. In another embodiment, the coil module 10 may include any number of fixing members 110 based on the shape of the metal frame 100. For example, a hexagonal metal frame may be disposed with 3 or 6 fixing members. In addition, the main structure of the coil module 10 is composed of the upper lid 120, the coil 102, the magnetic conductor 104, the metal frame 100, the circuit board 106 and the lower lid 130 from up and down, and these elements may be connected and fixed to each other by any appropriate method. For example, the coil 102, the magnetic conductor 104 and the metal frame 100 may be glued and thereby fixed to each other. The upper lid 120, the circuit board 106 and the lower lid 130 may be fixed on the metal frame 100 via screws. Alternatively, one or more latches may be applied to fit the upper lid 120 on the metal frame 100. Those skilled in the art may select appropriate method(s) to combine the above elements, and the combination method should not be a limitation of the present invention.

To sum up, the present invention provides an induction type power supply system and a related coil module applicable to AGVs. The coil module may be composed of the elements such as the upper lid, coil, magnetic conductor, metal frame, circuit board and lower lid. Since the AGV may deviate when moving, a collision may occur between the coil modules on the AGV and the coil modules on the charging pillar. Therefore, the coil modules of the present invention are designed to have the shock absorption structure to mitigate or eliminate the collision force, and the sides of the upper lid may be realized with an arc structure to mitigate the collision force. Further, the upper lid may be manufactured with a non-metal material allowing energies of the coil to pass. The magnetic conductor is disposed between the coil and the metal frame, to prevent the coil energies from being transmitted to the metal to generate heat. The circuit board may carry control circuits for controlling operations of the coil. The supplying-end coil and the receiving-end coil may apply different control circuits. The lower lid may be manufactured with a transparent material, allowing the user to easily watch the information displayed on the circuit board, so as to perform trouble shooting immediately when a problem occurs. In addition, multiple coil modules may be connected to the power receiving terminal in series and/or in parallel, to realize the applications with large output power (such as high voltage and/or high current).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A coil module for an induction type power supply system comprising:
   a metal frame;
   a coil, disposed on a first surface of the metal frame;
   a circuit board, disposed on a second surface of the metal frame, the circuit board comprising a control circuit for controlling operations of the coil; and
   an upper lid, for covering the coil, the upper lid composed of a non-metal material and having an arc structure.

2. The coil module of claim 1, further comprising:
   a lower lid, for covering the circuit board, the lower lid composed of a transparent material.

3. The coil module of claim 2, wherein when the lower lid is disposed on the metal frame, the lower lid entirely shields the circuit board.

4. The coil module of claim 1, wherein when the upper lid is disposed on the metal frame, the upper lid entirely shields the coil.

5. The coil module of claim 1, further comprising:
   a magnetic conductor, disposed between the coil and the metal frame, for isolating electromagnetic energies of the coil.

6. The coil module of claim 1, wherein the metal frame is composed of aluminum.

7. The coil module of claim 1, further comprising:
   at least one fixing member, for fixing the metal frame on an external fixing frame;
   wherein each fixing member has a shock absorption structure.

8. The coil module of claim 7, wherein the fixing member comprises a spring screw, a gas shock absorber or a hydraulic shock absorber.

9. The coil module of claim 1, wherein the metal frame comprises a hole, and a wire connected with the coil passes through the hole to reach the circuit board.

10. An induction type power supply system, comprising:
    a plurality of fixing frames; and
    a plurality of coil modules, each disposed on one of the plurality of fixing frames and comprising:
    a metal frame;
    a coil, disposed on a first surface of the metal frame;
    a circuit board, disposed on a second surface of the metal frame, the circuit board comprising a control circuit for controlling operations of the coil; and
    an upper lid, for covering the coil, the upper lid composed of a non-metal material and having an arc structure.

11. The induction type power supply system of claim 10, wherein a first coil module disposed on a first fixing frame among the plurality of fixing frames is served as a supplying-end coil for supplying electric power when the first fixing frame is disposed in a charging station, and a second coil module disposed on a second fixing frame among the plurality of fixing frames is served as a receiving-end coil for receiving electric power when the second fixing frame is disposed in a power receiving device.

12. The induction type power supply system of claim 11, wherein the power receiving device moves to a side of a charging pillar in the charging station, so that the second coil module disposed on the power receiving device is aligned with the first coil module disposed on the charging pillar, allowing the second coil module to receive electric power from the first coil module.

13. The induction type power supply system of claim 10, wherein a back-end circuit of the plurality of coil modules is connected to a power receiving terminal in parallel.

14. The induction type power supply system of claim 10, wherein a back-end circuit of the plurality of coil modules is connected to a power receiving terminal in series.

15. The induction type power supply system of claim 10, wherein each of the plurality of coil modules is mounted on the corresponding fixing frame via at least one fixing member.

\* \* \* \* \*